3,766,087
PROCESS FOR TREATING POLLUTED WATER WITH LOW TEMPERATURE BRINE SOLUTION
Jacob Greenberg, Ventnor City, N.J., assignor to Anti-Pollution Systems, Inc., Pleasantville, N.J.
Filed June 27, 1972, Ser. No. 266,584
Int. Cl. B01d 17/00
U.S. Cl. 252—348                                7 Claims

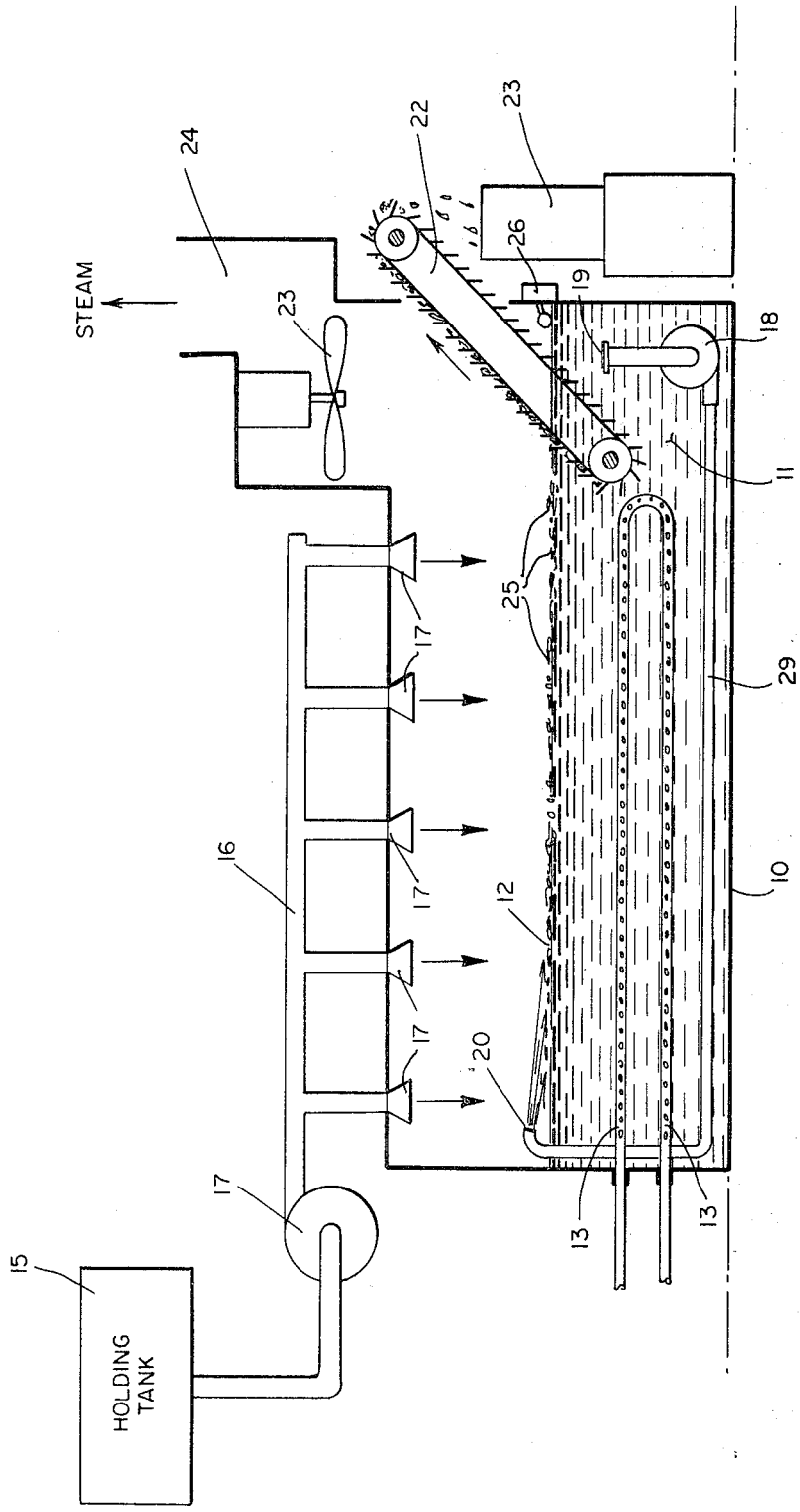

ABSTRACT OF THE DISCLOSURE

A process for treating polluted water, and particularly water comprising an emulsion of acrylic residues, wherein the polluted water is fed onto the surface of a brine solution maintained at the boiling point, the emulsion being broken instantly at the surface of the brine and accumulated as an organic residue, while the water is boiled off. The organic residue is skimmed off for separate handling.

BACKGROUND OF THE INVENTION

(A) Field of the invention

This invention lies in the field of processes for treating polluted water and, more specifically, processes for separating acrylic emulsions from water for efficient and safe disposal thereof.

(B) Description of the prior art

The purification of polluted liquids such as are produced by industrial processes has long been a difficult problem because of the requirement of separating and/or drying the non-aqueous residues prior to discharging the water solution. In many industrial processes, large volumes of liquid wastes are produced which if merely dumped into rivers and streams, would cause massive pollution, but which are not suitable for easy elimination due to their wetness. In particular, water having organic residues such as acrylics, where the acrylic emulsion constitutes only about 2% or so of the total solution by weight, have been difficult to treat because such a solution does not lend itself to conventional chemical treatment or to conventional drying procedures. There is thus a long felt and extremely urgent need for an efficient and high capacity process for purification of such polluted liquids.

SUMMARY OF THE INVENTION

It is a primary object of this invention to provide a process for efficiently separating acrylic emulsions and like compositions from water, so that the water content may be disposed of in a relatively pure and non-polluting form.

It is a further object of this invention to provide a method whereby a brine solution is maintained at the boiling point, and a polluted water solution containing an acrylic emulsion is contacted with the brine so as to break the emulsion and boil off the water content, leaving an organic residue which may be efficiently skimmed off.

Accordingly, this invention provides a process of maintaining a saturated salt solution (brine) at the boiling point, and introducing onto such brine solution polluted water containing an acrylic emulsion. The emulsion is broken instantly at the surface of the brine and accumulates as organic residue while the water is being vaporized and drawn off. The organic residue is continuously pushed, drawn or otherwise moved toward a skimmer, as by an overflow pump, and removed from the brine solution.

BRIEF DESCRIPTION OF THE DRAWING

The drawing shows, in diagrammatic form, a system as used for carrying out the process of this invention.

DETAILED DESCRIPTION OF THE INVENTION

The polluted water which is to be handled by the process of this invention may in general be any water solution containing an organic emulsion. The organic emulsion may be such emulsion that does not admit of an efficient separation by conventional techniques, and which is harmful if allowed to be introduced into streams and other rivers. Specifically, but without limitation, this specification deals with the process as practiced on a solution containing about 2% acrylic emulsion by weight in water. The acrylic emulsion contains substantially equal portions of ethyl and methyl acrylates.

Referring to the drawing, there is shown a container 10 in which is maintained a brine solution 11 having a level 12. The solution is preferably a concentrated brine solution of water and salt. The process is non-specific as to the salt, and may be worked with good results with ordinary NaCl, chlorates, nitrates and carbonates. In a preferred embodiment, the brine is a saturated solution of NaCl (39.8% by weight), with some small amount of salt settling at the bottom of container 10.

A gas fired immersion tube 13 is positioned within container 10 below the brine surface 12, and provides a source of heating energy to maintain the brine at or just above the boiling level. In the preferred embodiment, the brine solution is maintained at the boiling point, i.e., above 100° C. It is, of course, understood that any suitable means of heating may be employed.

The polluted water solution is fed from a holding tank 15 through a spigot feed 16, having a plurality of spigots 17 from which the polluted solution is entrained or dropped onto the surface 12 of the brine. A pump 17 is used for transporting the solution into the spigot feed.

A second pump 18 takes brine collected from an inlet 19 near the surface 12, and pumps it through pipe 29 to an ejecting orifice 20 positioned so that the emitted brine pushes the accumulated organic residue (noted at 25) on the surface 12 from left to right as seen in the drawing. There is thus, in the illustration, a clockwise circulation of the brine, transporting the surface accumulation of organic residue, or scum, toward a conventional skimmer 22 which removes the scum and deposits it into a collection drum 23. This skimming system is exemplary only, and any type of conventional skimming apparatus and/or system may be utilized which has the function of transporting the scum on the surface to a point where it may be skimmed or otherwise removed into a suitable collection instrument.

In operation, the polluted solution is spread from spigot 17 and distributed substantially uniformly onto the surface 12 of the brine. The brine, which is maintained at the boiling point, causes the emulsion to be broken instantly at the surface, such that it accumulates as organic residue. This effect in breaking the emulsion is also known as "salting-out." At the same time that the emulsion is being broken, the water is being boiled off, and is drawn by exhaust fan 23 through port 24 where it is passed into the atmosphere in a safe and substantially pure form. The remaining organic residue, or scum, is pushed and/or drawn toward the skimmer and removed into the collection drum. Since there is about a 5% carryout of the salt with the curdled scum, or organic matter, the salt must be periodically replenished. In practice, the pump 18 and skimmer 22 operate continuously, drawning off the unburned residue. The system has been operated successfully at a rate of pressing 400 gal./hour of polluted water having a 2% emulsion content. It is, of course, understood that the system capacity may be enlarged by appropriate engineering design, and the method as claimed is not limited by the system rate.

A water balance is maintained in the system, by adapting the rate of feed from the holding tank to the vapor exhaust rate, such that the amount of water passing through port 24 substantially equals that being fed in through spigot feed 16. The surface 12 may be monitored, by conventional level detecting device 26, with a signal derived to control the operation of pump 17 so as to provide a closed loop servo-type system for maintaining surface 12 within any prescribed range.

As noted before, the salt that is used in the process of this invention is non-specific. The process disclosed herein may be performed with excellent results using NaCl, chlorides, nitrates and carbonates. It is to be understood that the process may be practiced at higher temperatures, by maintaining a salt bath of higher concentration. However, maximum efficiency is obtained by running the system relatively cool, i.e., no higher than 230° F., within which temperature efficient breaking of the emulsion is obtained, as well as efficient boiling off of the water. Indeed, it is a primary feature of applicant's process that it can be carried out at a low temperature, contrasted with prior art schemes requiring high temperatures and high levels of energy consumption.

As used herein, the term brine is understood to encompass saturated solutions of salt. While a preferred embodiment has been given wherein the brine was 39.8% NaCl by weight, the brine may have any percentage salt by weight, so long as it is saturated, and the boiling temperature is within 230° F.

It is also to be understood that the amount of organic emulsion is not limited to 2% by weight, as illustrated in the preferred embodiment. Any percentage of organic emulsion by weight up to 5% may be readily handled by the process of this invention.

What is claimed is:

1. A process for treating polluted water containing an organic emulsion by separating such emulsion from the water, comprising:

(a) maintaining a brine solution in a container and at its boiling point;
    (b) introducing the polluted water onto the surface of said brine solution;
    (c) continuously breaking the emulsion at the surface of the brine solution and boiling off the water content of the polluted water; and
    (d) skimming off the broken emulsion.

2. The method as described in claim 1 wherein polluted water comprising an emulsion of acrylic residues is introduced.

3. The method as described in claim 1 wherein said brine solution is maintained as a saturated solution of salt in water.

4. The method as disclosed in claim 1 wherein said brine solution is maintained at a temperature no greater than 230° F.

5. The method as described in claim 2 wherein said polluted water contains about 2% by weight of acrylic residue.

6. The method as described in claim 5 wherein said acrylic emulsion contains substantially equal portions of ethyl and methyl acrylates.

7. The method as described in claim 2 wherein said polluted water contains up to 5% by weight of acrylic residue.

References Cited
UNITED STATES PATENTS

| | | | |
|---|---|---|---|
| 3,344,042 | 9/1967 | Hardesty | 23—100 |
| 3,642,583 | 2/1972 | Greenberg | 203—11 |

JOHN D. WELSH, Primary Examiner

U.S. Cl. X.R.

252—346, 360; 203—11